United States Patent [19]

Litherland

[11] 4,089,534
[45] May 16, 1978

[54] PACKING ASSEMBLIES

[75] Inventor: James Albert Frazier Litherland, Walsall, England

[73] Assignee: Polypac B.A.L. Limited, Halesowen, England

[21] Appl. No.: 696,501

[22] Filed: Jun. 16, 1976

Related U.S. Application Data

[63] Continuation of Ser. No. 613,282, Sep. 15, 1975, abandoned, which is a continuation of Ser. No. 530,240, Dec. 6, 1974, abandoned.

[30] Foreign Application Priority Data

Dec. 29, 1973 United Kingdom ............... 60143/73

[51] Int. Cl.² ............................................. F16J 15/16
[52] U.S. Cl. ................................ 277/188 A; 277/168; 277/198; 277/199; 277/215
[58] Field of Search ............... 277/188 A, 188 R, 193, 277/198, 199, 215, 123, 124, 154, 165, 168

[56] References Cited

U.S. PATENT DOCUMENTS

| | | | |
|---|---|---|---|
| 2,841,429 | 7/1958 | McCuistion | 277/188 A |
| 3,215,441 | 11/1965 | Horvereid | 277/188 A |
| 3,473,814 | 10/1969 | Bastow | 277/188 A |
| 3,582,093 | 6/1971 | Lucien | 277/188 A |
| 3,727,925 | 4/1973 | Jones | 277/165 |

Primary Examiner—Richard E. Aegerter
Assistant Examiner—L. Footland
Attorney, Agent, or Firm—Andrus, Sceales, Starke & Sawall

[57] ABSTRACT

A packing assembly for location within a groove in one of a pair of relatively movable members comprises a deformable seal member having sealing lips engaging with the base wall of the groove and the surface of the other member, and a pair of support members. One or both side faces of each support member are provided with leakage grooves to enable fluid under pressure which collects in the zone defined between the support members, to be dissipated.

4 Claims, 3 Drawing Figures

U.S. Patent    May 16, 1978    4,089,534
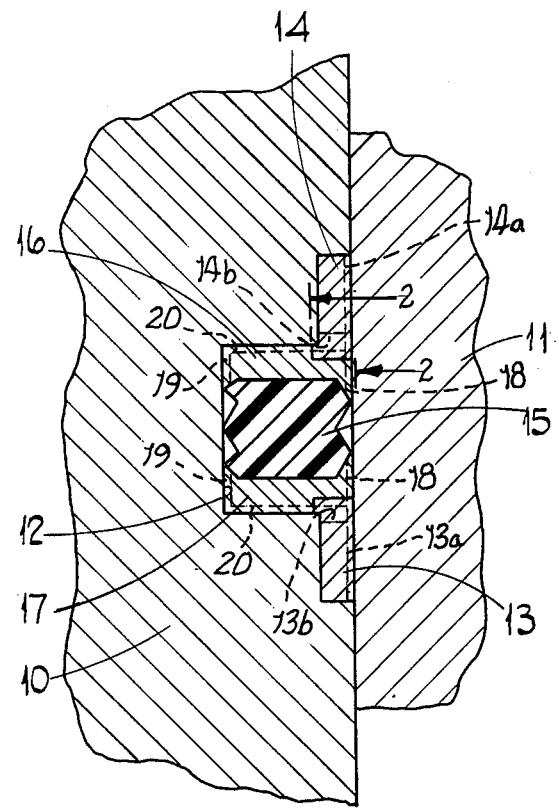
FIG.1.
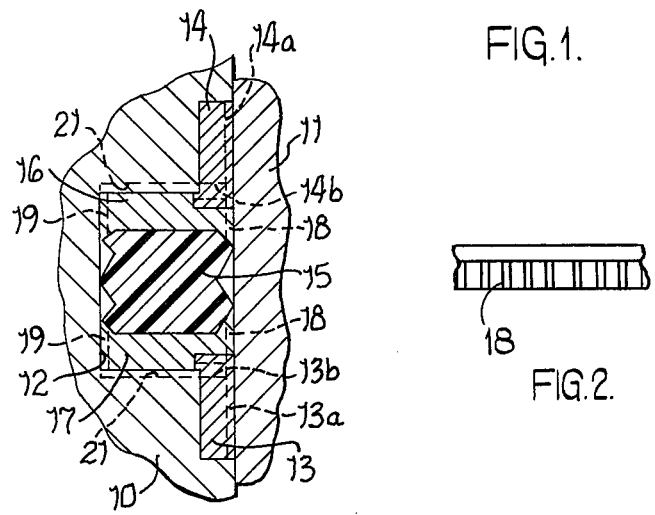
FIG.3.
FIG.2.

4,089,534

PACKING ASSEMBLIES

This is a continuation of application Ser. No. 613,282 filed Sept. 15, 1975, now abandoned, which in turn was a continuation of application Ser. No. 530,240, filed Dec. 6, 1974 and now abandoned.

This invention relates to packing assemblies for hydraulic piston-cylinder combinations. The packing assemblies are of the kind intended to be located within a groove in one of a pair of members which are movable relatively to each other in one direction, the assembly including a deformable seal member having sealing lips on opposite sides for fluid sealing engagement with the base wall of the groove and the surface of the other of the pair of members, and a pair of support members at the opposite ends respectively of the seal member, said support members being confined by the end walls of the groove, the seal member and support members extending substantially at right angles to the direction of movement.

Such packing assemblies are highly efficient at providing a fluid seal between the two members, however, a difficulty can arise which is thought to be due to the accumulation of fluid at a high pressure in a zone bounded at its opposite ends, by the support members. The fluid at high pressure can cause distortion of the support members to the extent that a mechanical lock is created which renders it impossible to move the two members relative to each other.

The object of the invention is to provide such an assembly in a simple and convenient form.

According to the invention, as assembly of the kind specified is characterised in that one of the side faces of each support member is provided with leakage grooves whereby fluid under pressure can leak from a zone bounded at its opposite ends by the support members.

One example of a packing assembly in accordance with the invention will now be described with reference to the accompanying drawings, in which:

FIG. 1 is a sectional side elevation of part of a piston cylinder combination including a packing assembly according to this invention, FIG. 2 is a view taken generally on line 2—2 of FIG. 1, and FIG. 3 is a view generally similar to that of FIG. 1 and shows a modification of the packing assembly.

Referring to the drawings, the piston is indicated at 10 and is disposed for reciprocation in the cylinder indicated, at 11. Formed in the wall of the piston is a stepped groove 12, the deeper portion of which accommodates the packing assembly whilst the shallower portions of the groove on opposite sides of the deeper portion, accommodate rings 13 and 14 which are relatively hard and serve to prevent extrusion of the packing assembly, but also serve as bearing rings to accommodate side thrust developed when the piston cylinder combination is in use. It should be pointed out that as shown in the drawing, the piston is of solid construction. However, in practice it will be necessary to split the piston in order to allow assembly of the packing assembly and the rings 13, 14. The rings 13, 14 are formed from synthetic resin material such for instance as Nylon.

The packing assembly comprises the deformable seal member ring 15 which is formed from elastomeric material conveniently a rubber and it is provided on its internal and external faces presented respectively to the base wall of the groove 12 and the wall of the cylinder 11, with sealing edges or lips. These edges co-operate with the adjacent surfaces to define a fluid seal.

At opposite sides of the seal member, there are disposed support members 16, 17. The support members engage with the side walls of the deeper portion of the groove 12, and are also recessed to partially accommodate the respective rings 13, 14. The support members are formed from a synthetic resin material and are dished on their faces which are presented to the seal member 15 in order to provide proper support therefore.

In relation to the axis of piston 10, the bearing rings 13 and 14 are provided with axially extending grooves 13a and 14a, respectively, and transverse drillings 13b and 14b, respectively, to ensure that the fluid under pressure at the active end of the cylinder 11 is transmitted to the adjacent end of the packing assembly to ensure fluid pressure actuation thereof. When this occurs, the sealing edges or lips are pressed into firm engagement with the base wall of the groove 12 and the wall of the cylinder 11 to ensure a positive fluid seal. As has been explained, it has been discovered that fluid under pressure can be trapped in the zone defined between the support members 16 and 17, and this fluid pressure can increase due, it is thought, to a pumping action created by the support members to the extent that distortion of the packing assembly occurs sufficient to create a mechanical lock thereby preventing relative movement of the piston and cylinder.

In order to overcome this difficulty, the support members 16 and 17 on their external faces presented to the cylinder 11, are provided with axially extending leakage grooves 18. The grooves 18 are perhaps best shown in FIG. 2. These grooves 18 communicating with the grooves 13a and 14a of the bearing rings 13 and 14 allow any pressure accumulating in the aforesaid zone between the support members 16 and 17 to be dissipated and thereby minimise the risk of formation of the locking action described above.

Additionally the internal faces of the support members 16, 17 which are presented to the base wall of the groove 12 may also be provided with axially extending leakage grooves 19, generally similar to grooves 18. The grooves 19 communicate with the corresponding drillings 13b and 14b and grooves 13a and 14a through the further transverse grooves 20 along the outer side walls of members 16 and 17 as shown in FIG. 1, or alternatively through the transverse grooves 21 in the side walls of the piston groove 12 as shown in FIG. 3. In this arrangement (FIG. 3) it will be understood that the grooves 20 defined on the outer surfaces of the members 16, 17 or the grooves 21 in the side walls of the groove 12 must communicate with the drillings and grooves in the rings 13, 14 to allow dissipation of the pressure from the zone between the ring members 16 and 17 adjacent to the base wall of the groove 12.

Whilst the example discloses the use of a packing assembly located within a groove defined on the piston, it will be appreciated that other situations exist where the packing assembly is located in a groove provided in the cylinder wall or the outer of the two members.

I claim:

1. In a packing assembly for disposition in an annular groove provided in one of a pair of relatively reciprocating confronting surfaces to seal the clearance between said surfaces, a deformable sealing ring disposed in said annular groove for fluid sealing engagement with the base wall of said annular groove and the opposed confronting surface, and a pair of support ring members respectively disposed on the opposite sides of the sealing ring and confined by the side walls of the annular groove, said support ring members making bearing engagement with the opposed confronting surface and the base wall of the annular groove and having passage means placing the zone between said opposed support ring members in communication with the clearance between the confronting surfaces to leak or dissipate fluid pressure from said zone, said passage means including axially extending leakage grooves formed on the external face of said support ring members.

2. The structure as set forth in claim 1 wherein said leakage grooves are also formed on the internal face of said support ring members.

3. In a packing assembly for disposition in an annular groove provided in one of a pair of relatively reciprocating confronting surfaces to seal the clearance between said surfaces, a deformable sealing ring disposed in said annular groove for fluid sealing engagement with the base wall of said annular groove and the opposed confronting surface, and a pair of support ring members respectively disposed on the opposite sides of the sealing ring and confined by the side walls of the annular groove, said support ring members making bearing engagement with the opposed confronting surface and the base wall of the annular groove and having passage means placing the zone between said opposed support ring members in communication with the clearance between the confronting surfaces to leak or dissipate fluid pressure from said zone, said passage means including axially extending leakage grooves formed on the internal face of said support ring members.

4. In a fluid seal for disposition between cylinder and piston members wherein one of said members is provided with a stepped annular groove which opens toward the opposed member, said groove having an intermediate deeper portion bounded by more shallow portions, a deformable sealing ring disposed in the intermediate portion of the annular groove and having sealing lips internally and externally for fluid sealing engagement with the base wall of the groove and the opposed member respectively, a pair of support rings respectively disposed on opposite sides of the sealing ring and confined by the side walls of the intermediate groove portion and in turn confining the sealing ring, said support rings extending between and making bearing engagement with the base wall of the intermediate groove portion and the opposed member, and a pair of bearing rings respectively disposed in the more shallow groove portions and extending axially into corresponding recessed portions of the support rings, said support rings and said bearing rings having communicating passage means placing the zone between the opposed support rings in communication with the clearance between said members to preclude fluid pressure entrapment within said zone.

* * * * *